Patented May 11, 1926.

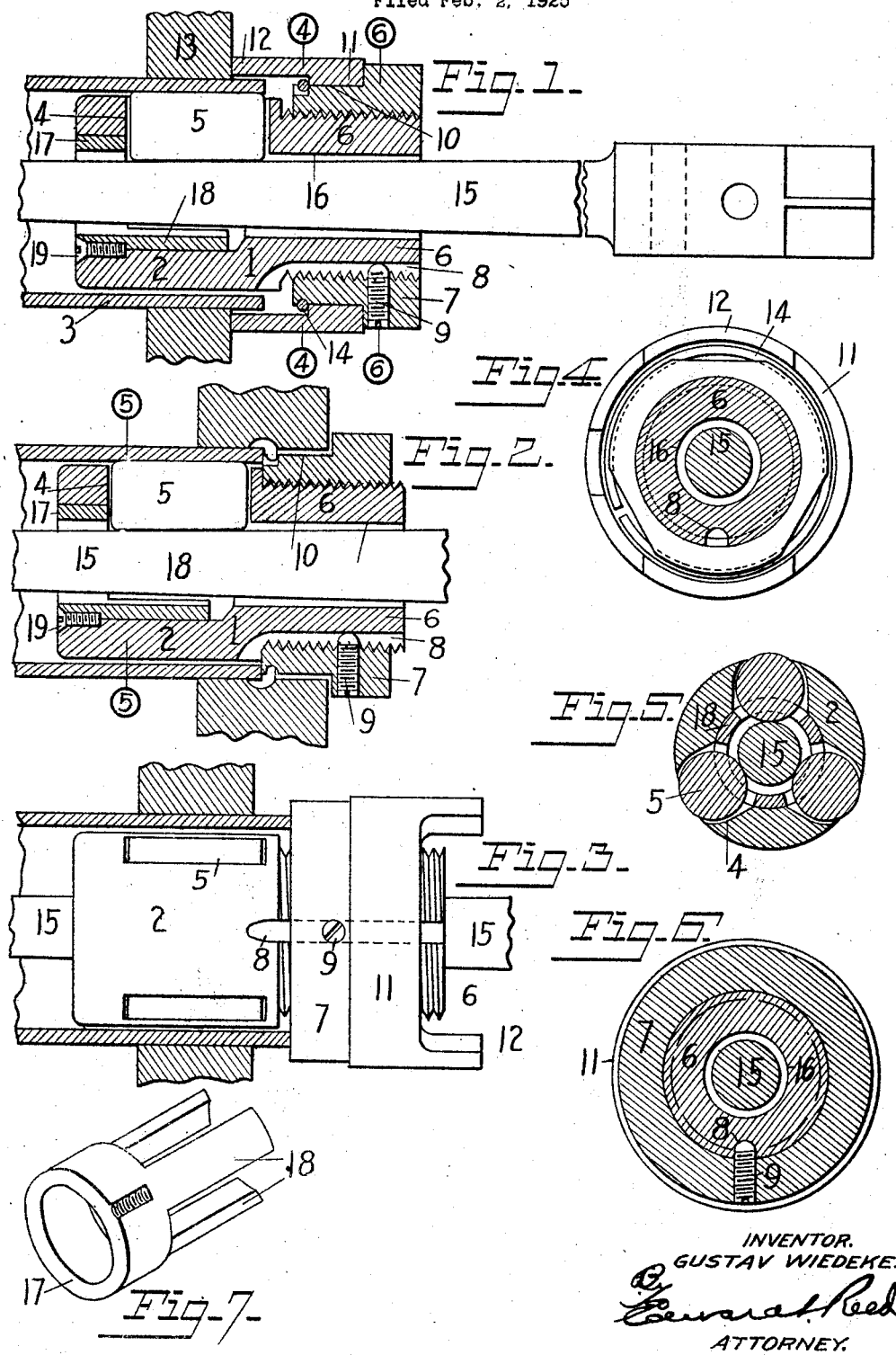

1,584,061

UNITED STATES PATENT OFFICE.

GUSTAV WIEDEKE, OF DAYTON, OHIO, ASSIGNOR TO GUSTAV WIEDEKE COMPANY, OF DAYTON, OHIO, A FIRM.

TUBE AND FLUE EXPANDER.

Application filed February 2, 1925. Serial No. 6,327.

This invention relates to tube and flue expanders of the type commonly used for expanding the tubes and flues of steam boilers to secure the same in the tube sheets.

One object of the invention is to provide such an expanding device in which the means for controlling the positions of the expanding rollers with relation to the tube sheet will have a relatively wide range of adjustability so as to permit the expanding rollers to be properly positioned with relation to the tube sheet regardless of the thickness of that sheet and regardless of the distance which the end of the tube or flue extends beyond the tube sheet.

A further object of the invention is to provide improved means for retaining the expanding rollers in position in the expander frame.

A further object of the invention is to provide a device of this kind which will be simple in its construction, inexpensive to manufacture and assemble and which will have a high degree of efficiency.

Other objects of the invention will appear as the device is described in detail.

In the accompanying drawings Fig. 1 is a longitudinal sectional view taken centrally of the expanding device embodying my invention; Fig. 2 is a similar view showing the guard and supporting collar adjusted to different positions to accommodate the device to a tube sheet of different thickness; Fig. 3 is a side elevation of such an expanding device showing the collar and guard reversed with relation thereto; Fig. 4 is a transverse section taken on the line 4—4 of Fig. 1; Fig. 5 is a transverse section taken on the line 5—5 of Fig. 2; Fig. 6 is a transverse section taken on the line 6—6 of Fig. 2; and Fig. 7 is a perspective detail view of the roller retaining device or cage.

In these drawings I have illustrated one embodiment of my invention and have shown the same as comprising an expander frame 1 having an inner portion 2 of an outer diameter slightly less than the inner diameter of the tube or flue, 3, which is to be expanded. This inner portion of the expander frame is provided with a series of longitudinally extending slots 4 spaced about the periphery thereof and adapted to receive expanding rollers 5, which are loosely mounted therein. In the present device, three rollers are employed but obviously any suitable number may be used. The outer portion of the expander frame is reduced in diameter, as shown at 6, and projects a considerable distance beyond the ends of the roller slots. This reduced end portion or shank of the expander frame has adjustably mounted thereon a collar 7. Preferably the collar is screw threaded onto this shank so that it may be adjusted to various positions lengthwise of the frame and is provided with means for retaining the same in adjusted positions. In the present device the screw threaded surface of the shank 6 of the frame is provided with a longitudinal slot 8 to receive the end of a screw 9 mounted in the outer portion of the collar. The inner portion of the collar is somewhat reduced in diameter, as shown at 10, to provide a seat on which is rotatably mounted a guard 11, which is provided with an inwardly extending flange 12 to engage the tube sheet 13 and properly position the rollers with relation to that sheet. The guard may be retained on the collar in any suitable manner which will not interfere with its rotation thereon and, as here shown, a resilient split ring or annular spring 14 is seated in a groove formed exteriorly of the inner portion of the collar and constituting a stop to hold the guard against longitudinal movement with relation to the collar. The flange 12 of the guard is spaced radially with relation to the frame so that it may overlap the rollers and permit the tube or flue to extend between the rollers and the guard when the rollers project beyond the outer surface of the tube sheet. It is desirable that the inner ends of the expanding rollers should project a short distance only beyond the inner surface of the tube sheet and by properly adjusting the collar and guard with relation to the expander frame the rollers may be adjusted to any desired position with relation to the tube sheet regardless of the thickness of that sheet. When the adjustment has been made the screw 9 is seated in the groove 8 and the collar is thus locked rigidly against movement with relation to the frame. Further, the collar may be removed from the screw threaded shank 6 of the expander frame and mounted thereon in a reverse position, as shown in Fig. 3, in which position the large end of the collar will abut against the end of the flue or tube and will rotate with relation thereto, thus holding the flue against outward creeping movement with relation to the expander. This arrangement is especially useful with tubes or flues having short projecting ends or when tightening flues or tubes which have already been beaded. It will be noted that the screw 9 and groove 8 for securing the collar in adjusted positions are of such a character and so arranged that they will cooperate to control the position of the collar when the latter is in either its normal position or its reverse position on the expander frame. By removing the guard 12 from the collar 6 the reduced inner end portion of the latter may be inserted in the opening of the tube sheet, thus enabling the same to abut against the end of a tube which terminates within the opening and to properly position the rollers with relation thereto. Likewise the device may be used in this way for expanding in the opening in the tube sheet a ferrule or nipple, the end of which is to be spaced from the outer edge of the opening, the collar thus serving to gauge the position of the nipple or ferrule with relation to the rollers.

I have also provided means for retaining the expanding rollers in the slots 4 which will permit of the insertion and removal of the rollers after the expander has been assembled. These rollers are held in position during the expanding operation by means of a tapered mandrel 15 but when this mandrel is removed the rollers will drop out of the slots unless some means are provided for retaining them therein. This has usually been accomplished by contracting the inner and outer edges of the slots so that the rollers are retained within the slots regardless of the mandrel 15. This is a more or less difficult manufacturing proposition and the rollers cannot be removed after they have once been inserted. In the present construction the rollers may be inserted from the inner end of the expander and may be firmly but removably secured therein. To this end the inner end of the longitudinal bore 16 of the expander is enlarged and the slots 4 are contracted at their outer edges only so that the rollers may be inserted or removed through the inner sides of the slots. Fitted within the enlarged portion of the bore of the expander frame is a retaining device which is here shown as a cage consisting of an annular collar 17 adapted to fit snugly within the bore 16 at the inner end of the frame and which is provided with a portion extending inwardly and having slots to register with the slots 4 in the frame, these slots being of a width less than the diameter of the rollers so that when the retaining device is in position the rollers cannot escape from the slots in the frame. To permit the ready insertion of the retaining device when the rollers are in the slots 4 the slots of the retainer are preferably open at the inner end of the retaining device and, as here shown, the collar 17 is provided with a series of fingers 18 which are spaced apart distances sufficient to form between them slots of less width than the diameter of the rollers. Thus, after the rollers have been placed in position in the slots 4, by inserting them through the inner end of the bore 16, the retaining device is inserted in the bore with the fingers 18 between adjacent rollers, and thus serves to retain those rollers within the slots 4. The retaining device may be secured within the expander frame in any suitable manner but, as here shown, the frame and retaining device are bored longitudinally so that a portion of the bore lies in the frame and a portion in the retaining device and this bore is threaded to receive a retaining screw 19 which holds the retaining device against both longitudinal and rotary movement. It will be apparent that by removing the screw 19 the retaining device is released and may be withdrawn to permit the removal of the expanding rollers.

While I have shown and described one embodiment of my invention I wish it to be understood that I do not desire to be limited to the details thereof as various modifications may occur to a person skilled in the art.

Having now fully described my invention, what I claim as new and desire to secure by Letters Patent, is:

1. In a device for expanding a tube in a tube sheet, an expander frame to extend into the end of said tube, rollers mounted in said frame, means for forcing said rollers into contact with said tube and for rotating said frame, said frame having a part extending outwardly beyond said rollers, a collar reversibly mounted on said part of said frame and having one end shaped to engage the end of the tube when said collar is in one position on said frame, and a guard rotatably mounted on said collar and having a portion extending beyond the other end of said collar and arranged to engage the tube sheet about said tube when said collar is in its other position on said frame.

2. In a device for expanding a tube in a tube sheet, an expander frame to extend into the end of said tube, rollers mounted in said frame, means for forcing said rollers into contact with said tube and for rotating said frame, said frame having a part extending outwardly beyond said rollers, a collar reversibly mounted on said part of said frame and having one end shaped to engage the end of the tube when said collar is in one position on said frame, said collar having its other end shaped to enter the opening in said tube sheet and engage the end of a tube in said opening when said collar is in its other position on said frame.

3. In a device for expanding a tube in a tube sheet, an expander frame to extend into the end of said tube, rollers mounted in said frame, means for forcing said rollers into contact with said tube and for rotating said frame, said frame having a part extending outwardly beyond said rollers, a collar reversibly mounted on said part of said frame and having one end shaped to engage the end of the tube when said collar is in one position on said frame, said collar having its other end shaped to enter the opening in said tube sheet and engage the end of a tube in said opening when said collar is in its other position, and a guard removably mounted on said collar and having a portion extending beyond the last mentioned end of said collar.

4. In a device of the character described, an expander frame, rollers mounted in said frame, said frame having a part extending outwardly beyond said rollers and provided with exterior screw threads, a screw threaded collar mounted on said threaded portion of said frame, a guard rotatably mounted on said collar and having a portion extending inwardly from said collar and spaced from said frame such a distance that it may be moved into overlapping relation to the adjacent ends of said rollers and will be spaced radially from said rollers.

5. In a device of the character described, an expander frame, rollers mounted in said frame, said frame having a portion of reduced diameter extending outwardly beyond said rollers and provided with exterior screw threads, a collar removably mounted on the screw threaded portion of said frame and having an enlarged outer end, a guard rotatably mounted on the inner portion of said collar and projecting beyond the inner end thereof, and means for holding said collar in adjusted positions on said frame.

6. In a device of the character described, an expander frame having its inner portion provided with slots, rollers mounted in said slots, a removable retaining device mounted in said frame for holding said rollers in said slots, said frame having a portion extending outwardly beyond said rollers, a collar adjustably mounted on said portion of said frame, and a guard rotatably mounted on said collar.

7. In a device of the character described, an expander frame having its inner portion provided with slots, rollers mounted in said slots, and a cage removably mounted in said frame to hold said rollers in said slots.

8. In a device of the character described, an expander frame having a longitudinal bore and having its inner portion provided with slots, the inner portion of said bore being enlarged, rollers mounted in said slots, and a cage removably mounted in the enlarged portion of said bore to retain said rollers in said slots.

9. In a device of the character described, an expander frame having a longitudinal bore and having its inner portion provided with slots, the inner portion of said bore being enlarged, rollers mounted in said slots, and a retaining device mounted in the inner end of said bore and having fingers extending between the adjacent rollers and spaced apart distances less than the diameter of said rollers.

10. In a device of the character described, an expander frame having a longitudinal bore and having its inner portion provided with slots, the inner portion of said bore being enlarged, rollers mounted in said slots, a retaining device comprising a collar fitted in the enlarged end of said bore and having a series of fingers extending into said bore, between adjacent rollers, and spaced apart distances less than the diameter of said rollers, and means for rigidly securing said retaining device to said expander frame.

11. In a device of the character described, an expander frame having a longitudinal bore and having its inner portion provided with longitudinal slots, rollers loosely mounted in said slots, a retaining device mounted at the inner end of said frame and having fingers extending into said bore between the respective rollers, said fingers being spaced apart distances less than the diameter of said rollers.

12. In a device of the character described, an expander frame, rollers mounted in said frame, said frame having a part extending outwardly beyond said rollers, a collar adjustably mounted on said part of said frame and having a reduced inner end portion having near its inner end a circumferential groove, a guard rotatably mounted on the reduced portion of said collar and having a portion extending beyond the inner end of said collar, said guard being provided on its inner surface with a shoulder, and a split resilient ring seated in said groove and engaging said shoulder to retain the guard upon the collar.

In testimony whereof, I affix my signature hereto.

GUSTAV WIEDEKE.